United States Patent [19]
White

[11] Patent Number: 5,546,540
[45] Date of Patent: Aug. 13, 1996

[54] AUTOMATIC TOPOLOGY MONITOR FOR MULTI-SEGMENT LOCAL AREA NETWORK

[75] Inventor: Gerard White, Tyngsboro, Mass.

[73] Assignee: Concord Communications, Inc., Marlboro, Mass.

[21] Appl. No.: 641,156

[22] Filed: Jan. 14, 1991

[51] Int. Cl.$^6$ ............................................. G06F 13/00
[52] U.S. Cl. ................ 395/200.1; 395/284; 395/839; 371/20.1; 364/241.8; 364/242.94
[58] Field of Search ................................. 395/800, 325, 395/200, 200.01, 200.1, 200.15, 200.2, 828, 835, 838, 839, 284; 370/60, 85.8, 94.3, 95.2; 371/11.1–11.3, 8.2, 67.1, 68.2

[56] References Cited

U.S. PATENT DOCUMENTS

| | | | |
|---|---|---|---|
| 3,665,406 | 5/1972 | Gallagher et al. | 395/725 |
| 4,799,211 | 1/1989 | Felker et al. | 370/17 |
| 4,943,998 | 7/1990 | Bauer | 379/220 |
| 4,949,337 | 8/1990 | Aggers et al. | 370/85.4 |
| 5,014,192 | 5/1991 | Mansfield et al. | 395/600 |
| 5,084,870 | 1/1992 | Hutchison et al. | 370/94.1 |
| 5,101,348 | 3/1992 | Arrowood et al. | 395/200 |
| 5,109,486 | 4/1992 | Seymour | 395/200 |
| 5,128,926 | 7/1992 | Perlman et al. | 370/54 |

OTHER PUBLICATIONS

Sudama, et al. "The Design of a Real Time DECnet Performance Monitor" Digital Equipment Incorporation, Jul. 15, 1988.

"Analyzing TCP/IP Networks with the HP 4272A" Hewlett Packard Company, Nov. 1989.

"HP 4972A LAN Protocol Analyzer User's Guide" Hewlett Packard Company, Jun. 1990.

Dahbura, et al. "Formal Methods for Generating Protocol Conformance Test Sequences", *Proceedings of the IEEE*, Aug. 1990, pp. 1317–1326.

*Primary Examiner*—Alyssa H. Bowler
*Assistant Examiner*—Alpesh M. Shah
*Attorney, Agent, or Firm*—Cesari and McKenna

[57] ABSTRACT

A local area network (LAN) topology monitor including segment monitor nodes which report the presence of new end nodes to a network manager node. The segment monitors send a test-node message when requested by the network manager and inform the network manager of any test-node messages originating from other segments. The network manager uses the sequence of received new-node messages and test-node messages to determine the topology of the LAN. If one segment monitor reports a new node, the new node must be connected to the same segment as the reporting monitor. If multiple segment monitors report the presence of a new node, the network manager requests each reporting segment monitor to send a test-node message. Since the segment monitors report test-node messages received from other segment monitors, if only one segment monitor responds as having received a test-node message, then that segment contains the new node. Otherwise, the new node is off-segment. The presence of one or more bridges connected to particular segment may be similarly determined by having the network manager initiate on-segment test messages.

9 Claims, 7 Drawing Sheets

AUTOMATIC TOPOLOGY MONITOR FOR MULTI-SEGMENT LOCAL AREA NETWORK

FIELD OF THE INVENTION

This invention relates generally to local area networks (LANs) and particularly to a technique for automatically identifying the topology of a multi-segment LAN, including segment interconnection devices such as bridges and routers, without requiring the network components to perform any special functions.

BACKGROUND OF THE INVENTION

Peer-to-peer communication systems such as local area networks (LANs) are an increasingly popular choice for connecting many computers together. Within a LAN, multiple computer nodes may vie, on an equal basis, for access to a physical media of a moderately high bandwidth. A key feature of most LAN access methods is that they do not require a central communication controller. The result is a system that allows many nodes to be simply and quickly interconnected.

However, simplicity of access to a shared media means that LANs have some well known security problems. In particular, with the standard arrangement, there is no way to prevent an unauthorized user from connecting to the LAN and reading sensitive information. Furthermore, an unauthorized user can seriously disrupt the orderly operation of the LAN, by simply repeatedly transmitting messages, either intentionally or unintentionally.

The problem of locating unauthorized or malfunctioning nodes is exacerbated even further in an extended-LAN environment, where many LAN segments are interconnected by devices such as bridges and routers.

In most LAN installations, it is a major challenge for the LAN administrator to identify and locate the nodes connected to his LAN. Ideally this would be done automatically. However, not all nodes can be expected to cooperate in an interrogation process, and certainly not nodes which are malfunctioning or which have malevolent intent. Thus, automatic determination of the LAN topology is perceived to be quite difficult, if not impossible.

Available LAN monitoring methods fall short of what is needed. The crudest method is for the administrator to physically check the LAN cabling. At its best, this method is time consuming but accurate. At its worst, this method becomes physically impossible, such as when LAN segments are connected through gateways over telephone lines.

In other instances, the LAN administrator may use special purpose hardware. A particularly common method is for the administrator to issue commands which query the routing tables of any nodes on the network which act as routers or gateways. This requires the administrator to understand the routing data, however, and is by necessity restricted to those protocols for which routing data can be decoded. It is thus not applicable to the most popular LAN technologies such as personal computer LANs which use broadcast datagram services.

Other tools such as network monitors detect the LAN message traffic and decode source and destination addresses. This allows the administrator to determine which end nodes are active. Network monitors may also be configured to generate an alarm whenever a new node is seen. However, they cannot determine the LAN topology when more than one LAN segment is present, because the presence of segment interconnect devices such as bridges is not evident from simply examining source and destination addresses.

Ideally, a network topology monitor thus operates automatically and independently of any equipment connected to the end nodes, should be passive in the sense that it does not disrupt the state of any nodes, and should be able to determine the configuration of multiple-segment LANs, including the arrangement of bridges between segments.

SUMMARY OF THE INVENTION

The invention is a LAN topology monitor that includes a network manager node and one or more segment monitor nodes. A segment monitor node is associated with each LAN segment. Each segment monitor node detects the source address of message traffic between end nodes on its associated segment, and reports any potentially new nodes to the network manager. The segment monitors also send a test-node message to an end node whenever requested to do so by the network manager, and informs the network manager of any test-node messages it sees which originated from other segment monitors.

The network manager determines the topology of the LAN by using the received new-node messages and test-node messages from the segment monitors. In the trivial case, where only one segment monitor reports the new node, the network manager concludes it must be located on the same segment as the reporting segment monitor. If multiple segment monitors report the same new node, the network manager requests one of the reporting segment monitors to send a test-node message to the new node. Since every segment monitor reports test-node messages received from other segment monitors, if only one segment monitor responds as having received a test-node message, then that segment contains the new node. Otherwise, since test-node messages initiated by off-segment monitors always result in responses from several segment monitors, then the segment monitor under test does not contain the new node.

Most importantly, the test message need not be of a particular type or even require any response from the node. For example, in a bridged network using Open Systems Interconnect (OSI) layered protocols, a media access control (MAC) layer XID or TEST frame may be used. In a router network using the Defense Data Network protocol suite at the network layer, an ICMP echo request frame may be used.

The presence of one or more bridges connected to a particular segment may be similarly determined by having the network manager initiate on-segment test messages.

There are several advantages to this arrangement. Because the test messages do not require a response from or interfere with the normal operation of the nodes, the nodes need not participate in any special test protocol. Thus, the topology of a multiple-segment LAN may be automatically determined, without cooperation or participation of the end nodes.

Furthermore, a single methodology accommodates all types of end nodes, whether they are single user personal computers, multiple-user mainframe computers, or wide area network gateways.

Access to the internal routing tables or state machines of segment interconnection devices such as routers and bridges is not necessary.

The invention can be used to distinguish between a single segment LAN having multiple segment monitors and multiple segment LANs connected by a bridge.

BRIEF DESCRIPTION OF THE DRAWINGS

The above and further advantages of the invention may be better understood by referring to the following description and the accompanying drawings, in which.

DETAILED DESCRIPTION OF ILLUSTRATIVE EMBODIMENTS

Figure 1:
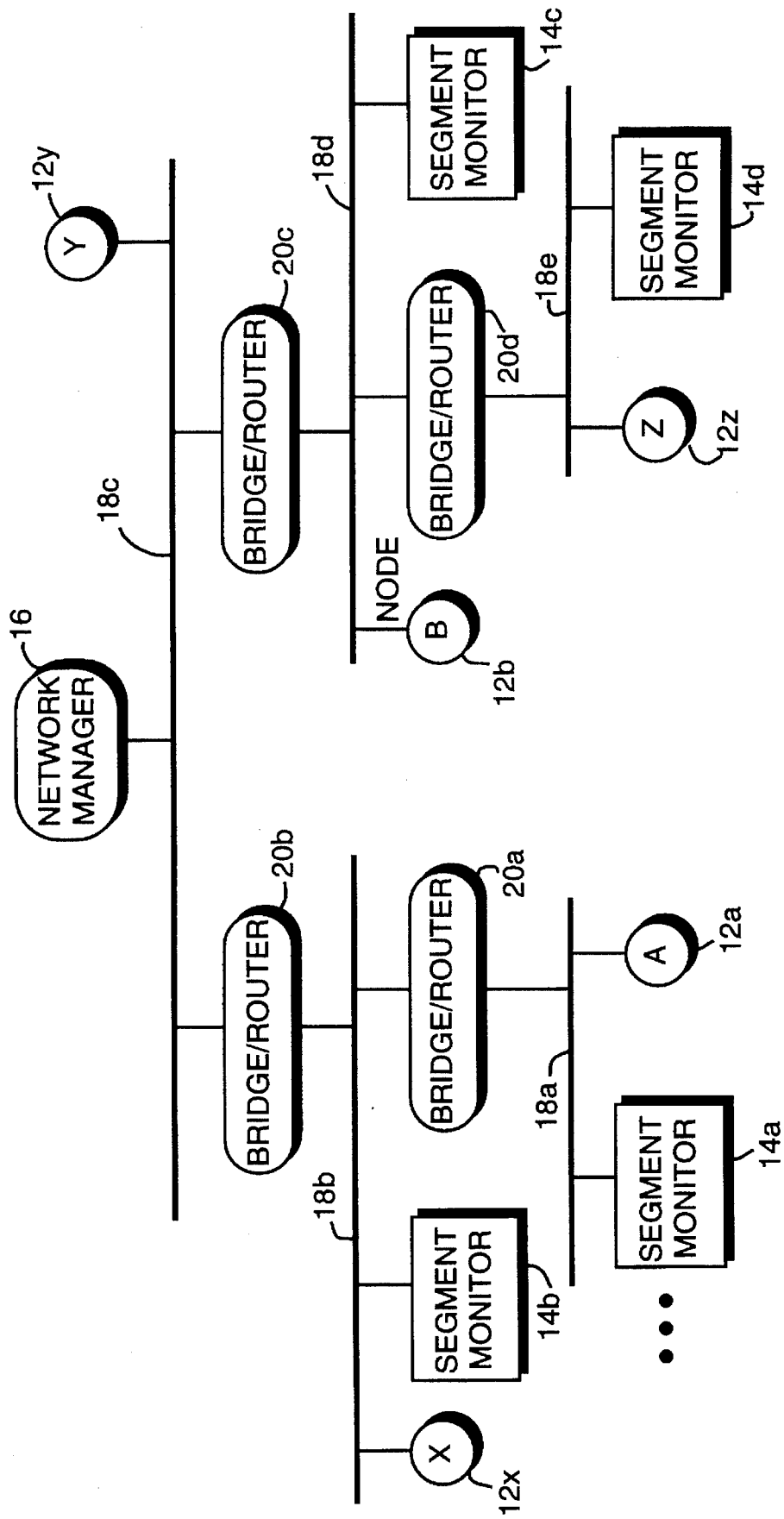
FIG. 1 is a block diagram of a LAN topology monitor in accordance with the invention, including a network manager node and several segment monitor nodes.

Turning now to the drawings more particularly, FIG. 1 shows a local area network (LAN) 10 including several nodes 12a, 12b, 12x, 12y, and 12z (collectively referred to as nodes 12). Each node 12 is typically connected to computer equipment such as a workstation, personal computer, mini-computer, mainframe-computer, device server or other computer network device. Certain other nodes 14a, 14b, 14c, and 14d perform special tasks and are called segment monitors 14. A third type of node performs other special tasks and is called a network manager 16. The segment monitors 14 and network manager 16 are typically implemented as digital computers; they may also be implemented as dedicated hard-wired circuits.

The various nodes 12 are connected into several LAN segments 18. For example, a first segment 18a consists of node 12a, segment monitor 14b, and other equipment sharing the physical media interconnecting them, as indicated by the dots. A second segment 18b consists of node 12x and segment monitor 14a; a third segment 18c consists of network manager 16; a fourth segment consists of node 12b and segment monitor 14c; and a fifth segment consists of node 12z and segment monitor 14d. There are typically many more nodes connected to each segment, which have not been shown for clarity. A segment monitor 14 must be connected to each segment for which automatic topology monitoring is desired.

The segments 18 are interconnected by segment interconnect devices 20. The interconnect devices 20 are typically either bridges or routers. Since the invention works equally well with both types of devices, for convenience in the following discussion, the interconnect devices are generically referred to as bridge-routers 20.

One bridge-router 20a, is connected to forward messages between segment 18a and segment 18b; Another bridge-router 20b is connected between segment 18b and segment 18c, bridge-router 20c is connected between segment 18c and segment 18d, and bridge-router 20d is connected between segment 18d and segment 18e.

The present invention is in the specific operation of the segment monitors 14 and the network manager 16. Generally speaking, the network manager 16 serves as a centralized controller that determines the current topology of the LAN 10 by receiving and transmitting messages to the several segment monitors 14. Each segment monitor 14 passively detects message traffic originating from the nodes 12 on its associated segment 18 to determine the presence of new nodes 12. Segment monitors 14 also send test-node messages to certain nodes 12 when requested to do so by the network manager 16, and report the status of test messages back to the network manager 16 back to the network manager 16.

Figure 2:
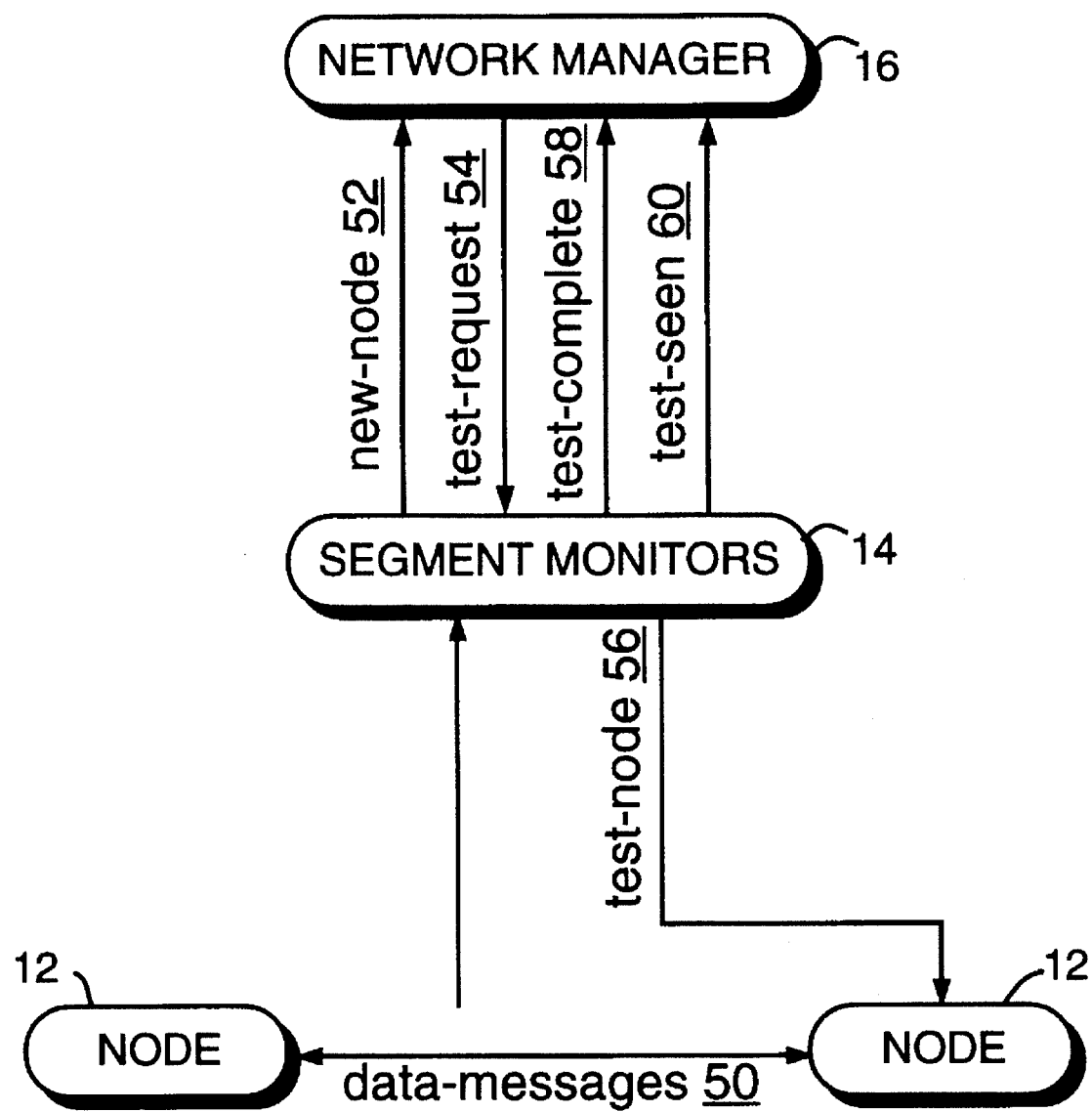
FIG. 2 is a generalized flow diagram showing the different types of messages exchanged between the network manager, segment motors, and nodes.

FIG. 2 is a generalized flow diagram depicting the several different types of messages exchanged between network manager 16 and the segment monitors 14, as well as between segment monitors 14 and the nodes 12. Data messages 50 exchanged between the nodes 12 are also observed by the segment monitors 14. By examining the data messages 50, the segment monitors 14 can determine the presence of new nodes 12, such as by detecting the source address of each data message 50 and comparing it to a list of known addresses. If the source address has not been previously seen, the segment monitor 14 sends the network manager 16 a new-node message 52 that includes the address of the new node 12.

If the node 12 is also new to the network manager 16, each segment monitor 14 that has reported seeing the new node 12 will receive a test-request message 54 from the network manager 16. This requests the segment monitors 14 to send a test-node message 56 to the new node 12. As will be understood shortly, the test-node message 56 need not be of any special type.

Once the test-node message 56 is sent, the segment monitor 14 preferably confirms this to the network manager 16 by sending a test-complete message 58. Additionally, if a given segment monitor 14 detects a test-node message 56 generated by another segment monitor 14, a test-seen message 60 is transmitted back to the network manager 16.

More particularly now, and referring to both FIGS. 1 and 2, the network manager 16 determines the topology of the LAN 10 by receiving new-node messages 52, test-complete messages 58 and test-seen messages 60 from the segment monitors 14, and by transmitting test-requests messages 54 to the segment monitors 14. For example, when the network manager 16 receives a new-node message 52 from a particular segment monitor 14, the network manager 16 first determines if the network address associated with the new node 12 has previously been reported by another segment monitor 14 and its location previously resolved. If so, the network manager 16 has already determined the placement of this particular node 12 in the network topology, and no further action is necessary. However, if the network address associated with the new-node message 52 has not previously been seen, the network manager 16 must determine if the new node 12 is subsequently reported by any other segment monitors 14.

In some instances, the message traffic from the new node 12 is confined to a single segment 18, and only one segment monitor 14 will detect the new network source address. Thus, the network manager 16 will conclude, after a suitable time-out period, that the new node 12 is connected to the same segment 18 as the segment monitor 14 that reported it.

Otherwise, such as when the new node 12 transmits off its own segment, the new node 12 will be reported by one or more of the other segment monitors 14. To isolate the segment 18 to which the new node 12 is connected, the network manager 16 transmits a test-request message 54 to each segment monitor 14 that reported the new node 12. The test-request message 54 in turn causes each segment monitor 14 to transmit a test-node message 56 to the new node 12.

The exact type of test-node message 56 varies according to the type of LAN 10; as will be understood shortly, the test-node message 56 need not require a response from the new node 12 or have any special qualities.

After sending the test-request 56 to a particular segment monitor 14, the network manager 16 then determines if other segment monitors 14 respond with test-seen messages 60. If so, the network manager 16 can infer that the new node 12a is not connected to the same segment as the particular segment monitor 14. However, when the test-request message 54 results in no test-seen messages 60 being returned from other segment monitors 14, the network manager 16 infers that the new node 12a is connected to the same segment as the segment monitor 14 under test.

In the event that resolution to a single segment 18 is not possible, such as may occur if a segment monitor 14 is not connected to certain segments 18, the network manager 16 can still recognize the node 12 as a new node having an unknown location on an unmonitored segment.

Returning attention now to FIG. 1, an exemplary sequence of messages exchanged between various nodes 12, segment monitors 14, and the network manager 16 will be described in more detail. Assume that a node 12a connects to the LAN 10 for the first time and begins transmitting data messages 50 to another node 12b. Segment monitors 14a, 14b, and 14c will detect the data messages 50 from node 12a and thus report the address of the new node 12a by sending a new-node message 52 to the network manager 16.

This causes the network manager 16 to send a test-request message 54 to a first one of the reporting segment monitors 14, such as segment monitor 14b.

Segment monitor 14b then sends a test-node message 52, such as a MAC-layer XID or TEST frame, to the new address at node 12a by forwarding it along segment 18b to the bridge-router 20a. Bridge-router 20a then forwards the test-node message 56 to segment 18a and thus to its destination at node 12a.

Most importantly, the test-node message 56 need not be of the type which requires any response or acknowledgment by any of the nodes 12. For example, in a bridged network operating with an Open Systems Interconnect (OSI) protocol as specified by the International Standards Organization (ISO), the test-node message 56 may be a media access control (MAC) layer XID or TEST frame.

After the test-node message 56 is sent by segment monitor 14b, the network manager 16 receives confirmation in the form of a test-complete message 58. The network manager 16 will then typically also receive a test-seen message 60 from segment monitor 14a, which also detected the test-node message 56 originating from segment monitor 14b.

Since the test-node message 56 was seen by more than one segment monitor 14, network manager 16 concludes that it has not yet resolved which segment 18 the new node 12a is connected to. Network manager 16 thus continues by sending a second test-request message 56 to another of the reporting segment monitors 14, such as segment monitor 14a. Since segment monitor 14a is connected to the same segment as node 12a, the network manager 16 receives only a test-complete message 58 from segment monitor 14a, and will not receive any test-seen messages 60 from the other segment monitors 14.

The network manager 16 may stop at this point and conclude that the new node 12a is connected to segment 18a.

Alternatively, the network manager 16 may continue to examine all possible scenarios by sending a test-request message 54 to segment monitor 14c. This causes segment monitor 14c to originate a test-node message 56 to the new address at node 12a. This test-node message 56 is seen by segment monitor 14a and segment monitor 14b. Accordingly, the network manager 16 receives a test-complete message 56 from segment monitor 14c as well as test-seen messages 60 from the other segment monitors 14a and 14b.

Given the above sequence of responses to test-request messages 54, network manager 16 can then finally conclude that the only possibility is that the new address at node 12a is local to segment 18a.

Operation for other types of networks is similar.

If the invention is implemented at other layers of the OSI model, such as the network layer, additional information may be extracted concerning the new node 12a. This can be done by keeping track of whether the MAC-layer address of the new node 12a differs from the network-layer address of the new node 12a.

For example, if both the MAC-layer address and network-layer address of the node 12a are new, then the network manager 16 can conclude that an entirely new station was dded to the LAN 10. If a new MAC-layer address is seen with an old network-layer address, the station itself may have previously been known, but a new MAC-layer interface card may have been installed or the station may have physically moved. If the MAC-layer address is old and the network-layer address is new, there has either been an address change in an existing station, or a new node has now appeared connected to the LAN 10 via a router 20.

Figure 3A:
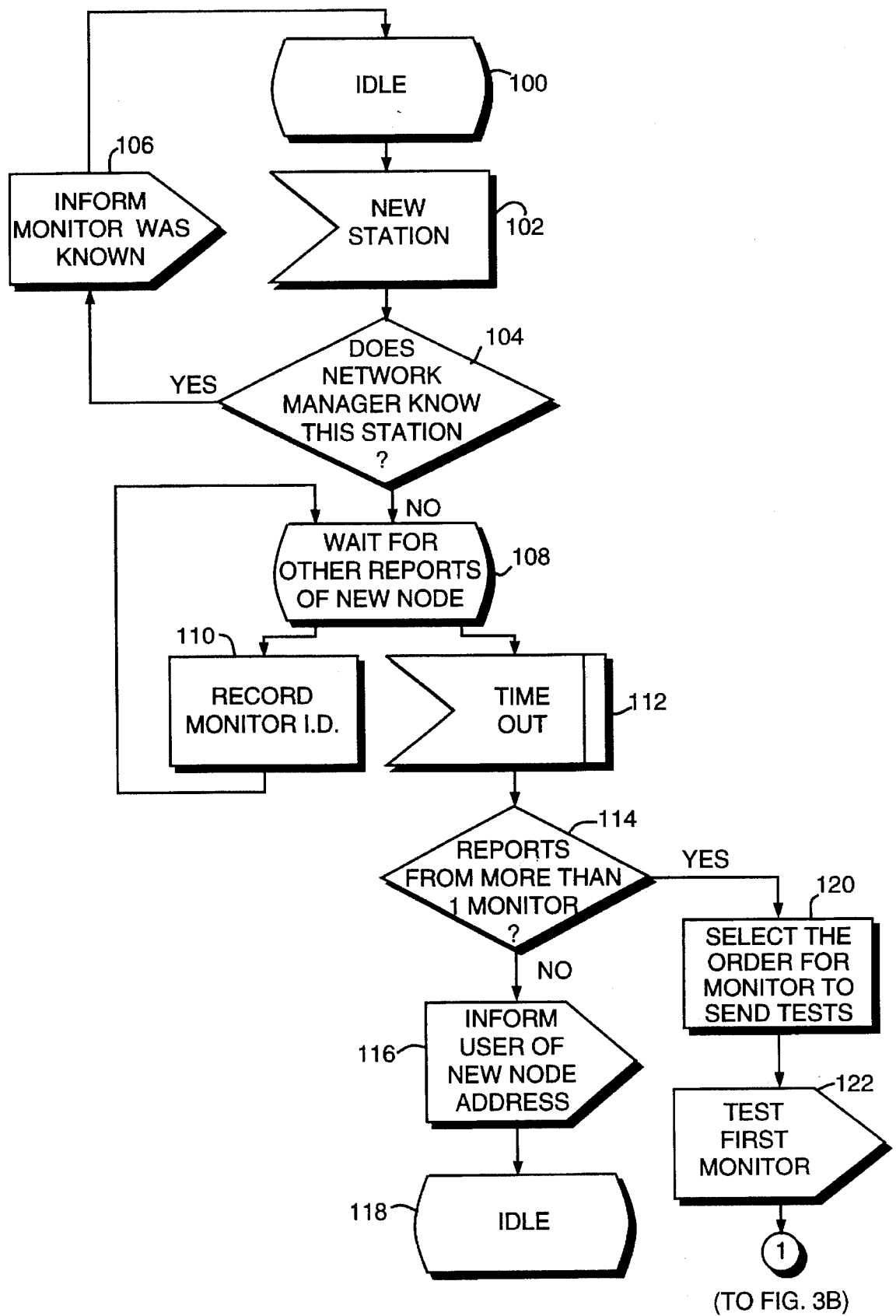
FIGS. 3A and 3B are flow charts of the operations performed by the network manager to determine the location of a new node.
Figure 3B:
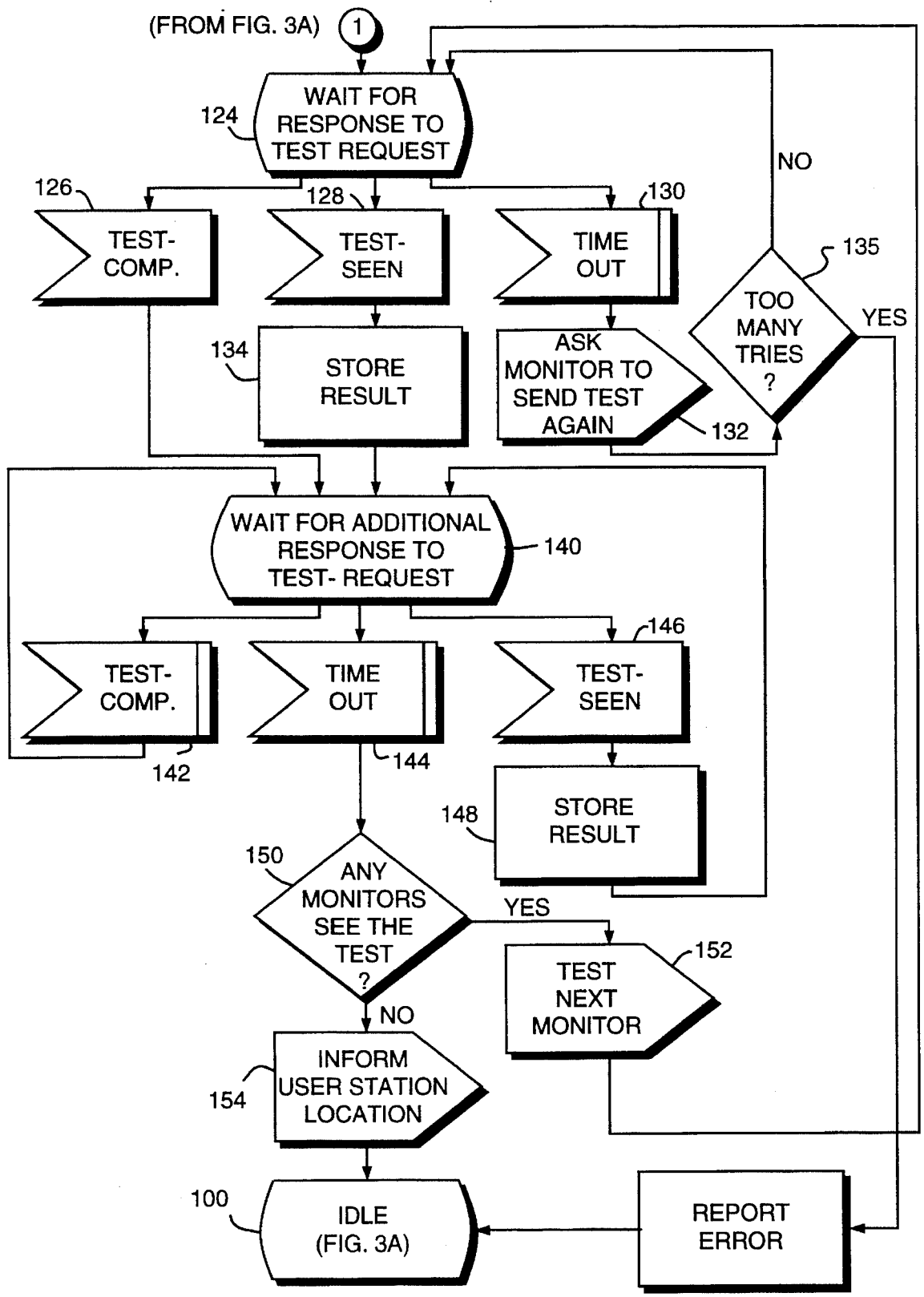

A detailed flowchart of the sequence of operations performed by the network manager 16 is shown in FIGS. 3A and 3B. Starting from an idle state in step 100 of FIG. 3A, processing proceeds to step 102 when a new-node message 52 is received from one of the segment monitors 14. In step 104, the network manager 16 compares the address associated with the new-node message 52 to a list of known node addresses. If the node is already known to the network manager 16, this fact is reported back to the segment monitor 14 in step 106, and the idle state is returned to.

However, if the address is new, the network manager 16 waits for additional reports of the same new address in step 108. The identification of each segment monitor 14 reporting the new address is recorded in step 110 until a suitable time-out period has elapsed. The time-out period depends upon the number of segments 18 and nodes 12 connected to the LAN 10.

In step 114, the network manager 16 then determines if new-node messages 52 were received from more than one segment monitor 14. If not, then step 116 informs the network administrator or other human user that the new node is located on the same segment as the segment monitor 14 which originated the new-node message. Processing then returns to the idle state 100.

However, if new-node messages 52 are received from more than one segment monitor 14, step 120 first establishes a list of segment monitors 14 which sent new-node messages 52. In step 122, the network manager 16 sends a test-request message 54 to the first segment monitor 14 on the list.

Continuing with step 124 of FIG. 3B, the network manager 16 then waits for a test-complete 58 or test-seen message 60 to be returned from one or more of the segment monitors 14. In step 126, if a test-complete message 58 is returned by the segment monitor 14 under test, then network manager 16 proceeds to step 140. If a test-seen message 60 is received from a segment monitor 14 which is not under test, then network manager 16 stores the identification of the other segment monitor 14 and proceeds to step 140. In step 130, if a time-out period expires with no response from any segment monitor 14, then the network manager 16 proceeds to step 132 to try sending another test-request message, and then returns to step 124 to wait again.

If the network manager 16 repeats the process of requesting a test and then times-out with no responses, it will conclude an error is present and abort the process in step 135.

Step 140 waits for additional responses to the test-request 54. If a test-complete message 58 is detected from the segment monitor 14 under test, control simply returns to step 140 from step 142. If a test-seen message 60 is received from another segment monitor 14, the identification of that segment monitor 14 is noted in step 148.

Once a test period time out has expired, control passes through step 144 to step 150. If any other monitors 14 sent a test-seen message 60, this indicates the new node 12a is not connected to the same segment as the segment monitor under test. Step 152 then returns to step 124 so that the next segment monitor 14 can be tested.

However, if no other segment monitors 14 return a test-seen message 60, then in step 154 the network manager 16 concludes that the new node 12 is connected to the same segment 18 as the segment monitor 14 under test. Control may then return to the idle state in step 100 of FIG. 3A.

Figure 4A:
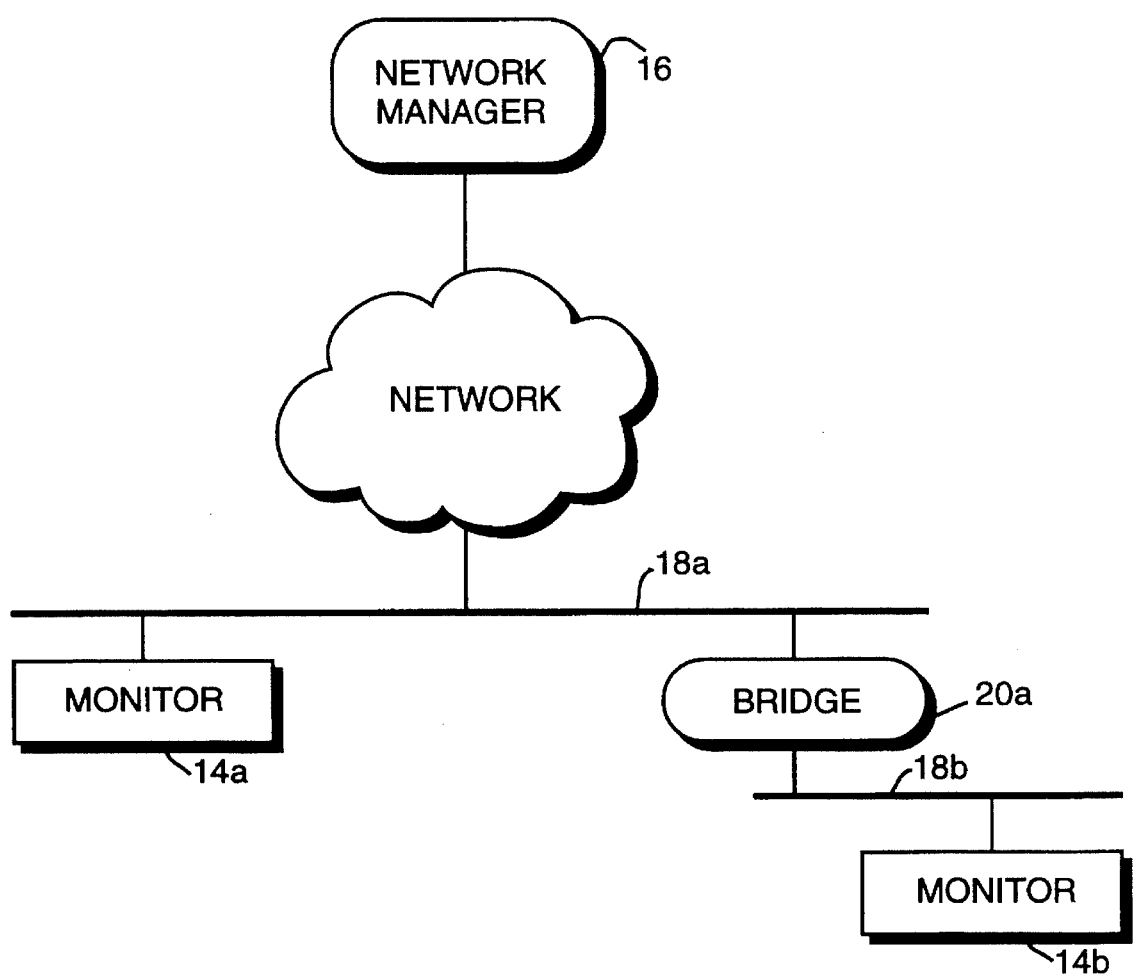
FIGS. 4A and 4B are block diagrams depicting two possible arrangements of bridges, and segment monitors.
Figure 4B:
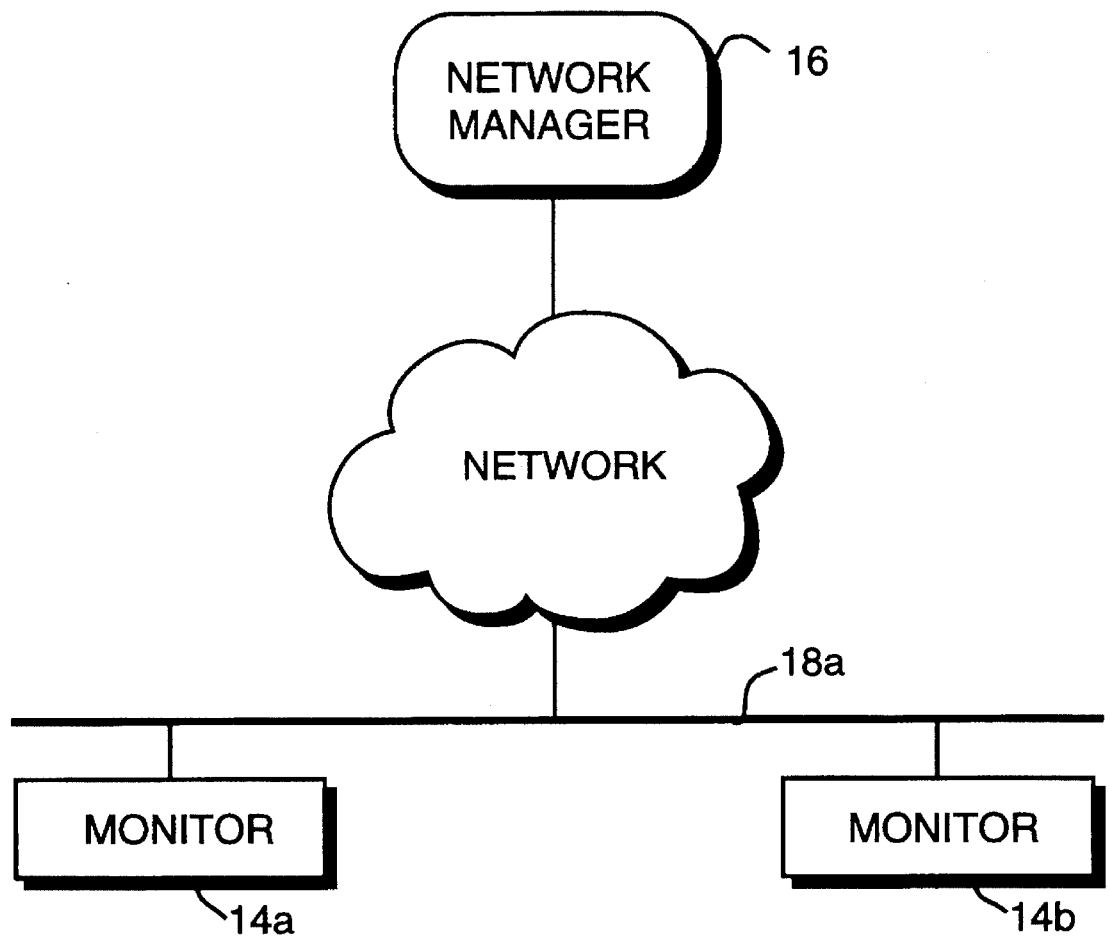
Figure 5:
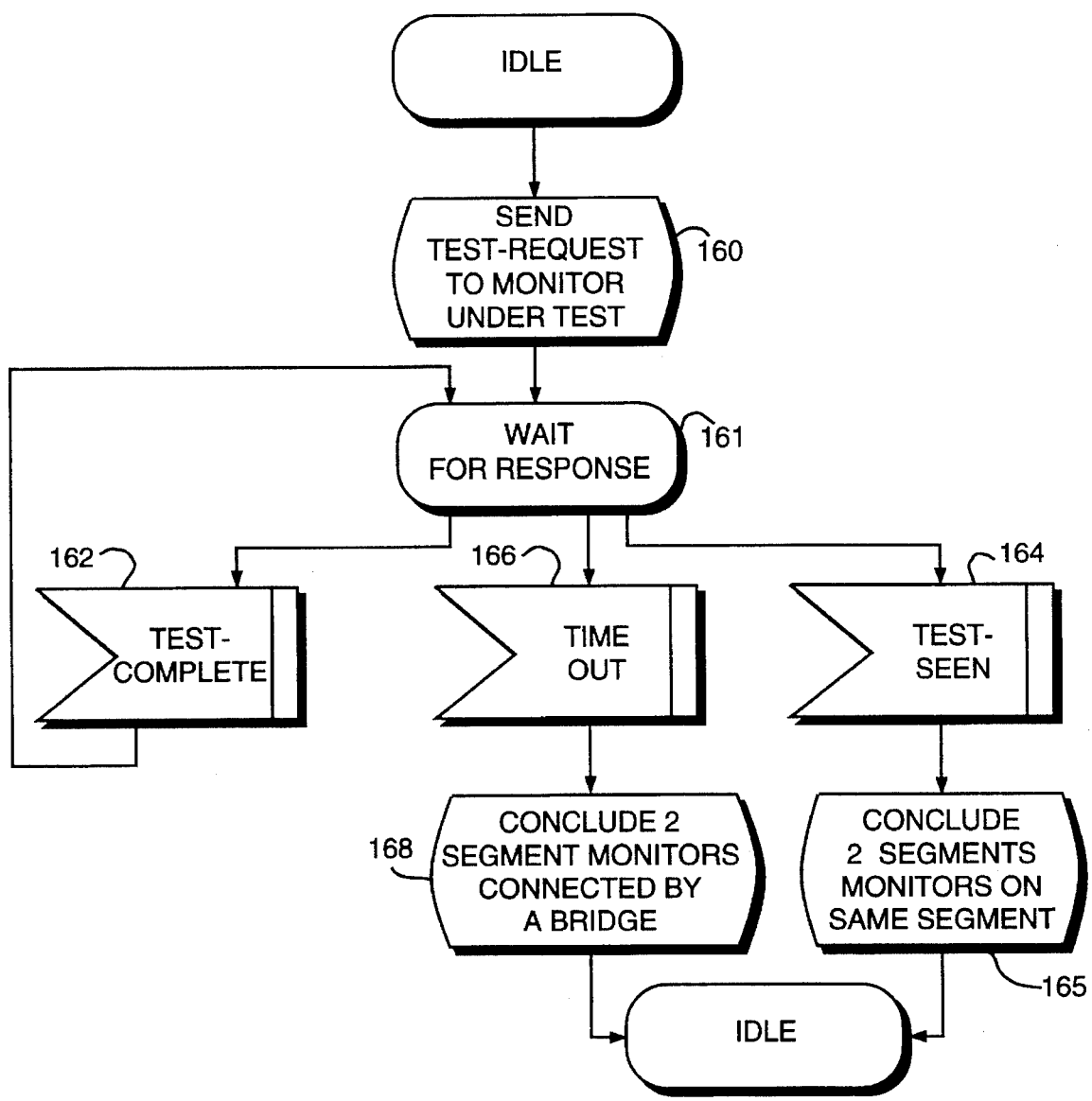
FIG. 5 is a flow chart of the operations performed by the network manager to determine the arrangement of bridges.

As previously mentioned, the location of bridges between segments can also be determined. Since bridges simply echo the message traffic between segments, one difficulty arises in distinguishing the situation of FIG. 4A, where a bridge 20a is connected between two segments 18a and 18b, from that of FIG. 4B, where two segment monitors 14 are connected to the same segment 18a. This sequence of steps to determine bridge placement is shown in FIG. 5; they can be executed before or after the steps of FIGS. 3A and 3B.

To distinguish the two situations, in step 160, the network manager 16 sends a test-request 54 to segment monitor 14a which asks segment monitor 14a to transmit a test message to itself. The segment monitor 14a does this and returns a test-complete message 58 to the network manager 16, in step 162. If the segment monitors 14 are on the same segment 18 (such as in FIG. 4A), the test-request message 54 will be detected by segment monitor 14b, causing it to send a test-seen message 60 to the network manager 16, as shown in steps 164 and 165. However, if the segment monitors 14 are on separate segments (such as in FIG. 4B), the test-request message will not be seen by segment monitor 14b, and after a suitable time-out period with no additional responses to the test-request 54, the network manager 16 can conclude that the segment monitors 14 are connected to different segments separated by a bridge, as shown in steps 166 and 168.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A monitor for determining the topology of a local area network (LAN) that includes a plurality of end nodes arranged into multiple segments interconnected by segment interconnection devices, the topology monitor comprising:

network manager means, connected to the LAN, for sending test-node messages to a plurality of the end nodes, the test-node messages of the type which do not require a response from the end nodes; and a plurality of segment monitor means, connected via the LAN to the network manager means and the end nodes, with each segment monitor connected to a particular segment and thus certain ones of the end nodes, wherein each segment monitor includes:

means for receiving the test-node messages from the network manager means;

means for determining if the test-node messages received from the network manager means are intended for the certain ones of the end nodes connected to the particular segment; and means for transmitting test-seen messages to the network manager means if the test-node messages are intended for one of the end nodes not connected to the particular segment.

2. A monitor for determining the topology of a local area network (LAN), where the LAN includes a plurality of end nodes arranged into multiple segments interconnected by segment interconnection devices, the topology monitor comprising:

network manager means, for transmitting a test-request message onto one of the LAN segments; and a plurality of segment monitor means, connected via the LAN to the network manager means and the end nodes, with each segment monitor connected to a particular segment, and wherein each segment monitor further includes:

means for receiving the test-request message from the network manager means;

means for transmitting a test-node message to one of the end nodes upon receipt of the test-request message from the network manager means; and means for transmitting a test-seen message to the network manager means upon receipt of a test-node message originated by another one of the segment monitor means.

3. A monitor as in claim 2 wherein the network manager additionally comprises:

means for indicating that a particular LAN segment does not include a particular end node, if one or more test-seen messages are returned by the plurality of segment monitor means in response to a single test-request message.

4. A monitor as in claim 2 wherein the network manager additionally comprises:

means for indicating that a particular LAN segment does include a particular end node, if no test-seen messages are returned by the plurality of segment monitor means in response to a single test-request message.

5. A monitor as in claim 2 wherein the test-node messages are of the type which do not require any response from the end nodes.

6. A monitor as in claim 2 wherein the test-node messages are of the type which do not require the end nodes to change state in any way.

7. A monitor as in claim 2 wherein the network manager additionally includes:

means for determining whether more than one segment monitor is connected to the same segment, by sending a test-request message which requests one of the segment monitors to send a test-node message to itself.

8. A monitor for determining the topology of a local area network (LAN), wherein the LAN includes two LAN segments interconnected by a bridge, the LAN segments each including a plurality of end nodes, the topology monitor comprising:

a network manager, connected to transmit a test-request message onto the LAN; and a pair of segment monitors, with each segment monitor connected via the LAN to the network manager as well as the end nodes, and with each segment monitor connected to a particular LAN segment, wherein each segment monitor further includes:

means for receiving the test-request message from the network manager means;

means for transmitting a test-node message to a particular one of the end nodes if the test-request message from the network manager means is intended for the particular end node; and means for transmitting a test-seen message to the network manager means upon receipt of a test-node message originated by another one of the segment monitor means.

9. A monitor for determining the topology of a local area network (LAN), where the LAN includes a plurality of end nodes arranged into one or more segments interconnected by segment interconnection devices, the topology monitor comprising:

network manager means, including:

means for receiving a new-node message which indicates the presence of a new end node connected to the LAN;

means for transmitting a test-request message in response to receipt of the new-node message, the test-request message requesting that a test message be sent to the new end node; and means for receiving a test-seen message in response to the test-request message; and a plurality of segment monitor means, connected via the LAN to the network manager means, wherein each segment monitor includes:

means for detecting the presence of the new end node, and in response thereto, transmitting the new-node message to the network manager means;

means for receiving the test-request message from the network manager means;

means for transmitting a test-node message to the new end node if the test-request message from the network manager means is intended for this particular segment monitor; and means for transmitting the test-seen message to the network manager if the test-request message is intended for another segment monitor.

* * * * *